United States Patent [19]

Dean

[11] Patent Number: 5,028,480
[45] Date of Patent: Jul. 2, 1991

[54] POLYMERIC FILMS

[75] Inventor: Darren W. Dean, Bridgwater, England

[73] Assignee: Courtaulds Films & Packaging (Holdings) Ltd., England

[21] Appl. No.: 364,429

[22] PCT Filed: Sep. 30, 1988

[86] PCT No.: PCT/GB88/00806
§ 371 Date: Jun. 1, 1989
§ 102(e) Date: Jun. 1, 1989

[87] PCT Pub. No.: WO89/02859
PCT Pub. Date: Apr. 6, 1989

[30] Foreign Application Priority Data

Oct. 5, 1987 [GB] United Kingdom ............... 8723322

[51] Int. Cl.$^5$ .............................................. B32B 3/26
[52] U.S. Cl. ................................. 428/314.4; 428/213; 428/314.8; 428/315.5; 428/315.9; 428/317.9; 428/516; 428/910
[58] Field of Search ............... 428/314.4, 315.5, 315.9, 428/317.9, 516, 910, 314.8

[56] References Cited

U.S. PATENT DOCUMENTS

| Re. 30,805 | 11/1981 | Rhoades. | |
|---|---|---|---|
| 4,377,616 | 3/1983 | Ashcraft et al. | 428/315.7 |
| 4,438,175 | 3/1987 | Ashcraft et al. | 428/317.9 |
| 4,578,297 | 3/1986 | Duncan. | |
| 4,632,869 | 12/1986 | Park et al. | 428/317.9 |
| 4,734,324 | 3/1988 | Hill | 428/317.9 |
| 4,741,950 | 5/1988 | Liu | 428/317.9 |

FOREIGN PATENT DOCUMENTS

| 1268823 | 3/1972 | United Kingdom. |
|---|---|---|
| 2150074 | 6/1985 | United Kingdom. |
| 2150881 | 7/1985 | United Kingdom. |
| 2177049 | 1/1987 | United Kingdom. |

Primary Examiner—William J. Van Balen
Attorney, Agent, or Firm—Bacon & Thomas

[57] ABSTRACT

The invention concerns polymeric films including a layer of polypropylene homopolymer with a layer of voided polypropylene on one side and a layer of a printable polymer on the other side. The printable polymer is preferably an acrylic polymer, a co- or terpolymer containing units derived form at least two of ethylene, propylene or but-1-ene, and/or a linear low density polyethylene. Films of the present invention have good gloss combined with printability and a pearlescent effect. They can also provide evidence of tampering with packaged goods.

13 Claims, No Drawings

POLYMERIC FILMS

This invention concerns polymeric films, and in particular polypropylene films.

It is known to form films from polypropylene which consist of a layer of polypropylene homopolymer on a layer of voided polypropylene. Such films can be produced by coextruding a layer of polypropylene homopolymer with a layer of polypropylene homopolymer containing a voiding agent, for example particulate chalk, and thereafter biaxially orienting the coextruded structure, for example using rolls rotating at different speeds in the direction of extrusion and using a stenter in the direction perpendicular thereto. The resultant films have a surface gloss when viewed from the side of the unvoided homopolymer layer, particularly when the homopolymer layer is relatively thick. However, homopolymer layers have poor ink receptivity and this makes them unsuitable for use as packaging materials which require printed indicia.

Printable polymer layers with good gloss can be provided by a relatively thick layer of a copolymer on a voided polypropylene layer, but such copolymer layers are expensive.

According to the present invention there is provided a polymeric film comprising a layer of propylene homopolymer having a layer of voided polypropylene on one side and a layer of a printable polymer on the other side.

The layer of propylene homopolymer is preferably from 2.5 to 25 microns thick, more preferably from 10 to 25 microns thick, and advantageously about 22 microns thick.

The voided polypropylene layer is preferably from 5 to 25 microns thick, more preferably from 10 to 25 microns thick, and advantageously about 22 microns thick.

The printable polymer layer will in general be considerably thinner than either the layer of hompolymer or the layer of voided polypropylene. The printable polymer layer will, however, usually be at least 0.1, more particularly at least 0.4 microns thick. Preferably such layers are up to 5 microns thick.

The polymer used to form the printable layer can be selected from those known in the art. Acrylic polymers can be used, for example random terpolymers of methyl acrylate, methyl methacrylate and methacrylic acid, or random interpolymers of styrene, butyl acrylate, methyl methacrylate and methacrylic acid. Alternatively, co- and ter-polymers containing units derived from two or more of ethylene, propylene, but-1-ene, acrylic esters, maleic anhydride and acrylic acid can be used, if desired in admixture, and/or a linear low density polyethylene.

If desired, the voided polypropylene layer can have one or more further polymeric layers thereon to provide four or five layer structures. A further polymeric layer can be provided, for example to give heat sealability and/or printability to the surface of the film opposite the layer of printable polymer on the homopolymer layer. Suitable polymers for providing heat sealability include co- or ter-polymers containing units derived from at least two of ethylene, propylene and but-1-ene and/or a linear low polyethylene. A further polymeric layer can additionally or alternatively be provided which contains a pigment, for example to increase the opacity of the film. The pigment can, for example, be titanium dioxide. The pigmented polymer can, for example, be a propylene copolymer layer. While further printable and/or heat sealable layers will be provided as an outer layer, pigmented layers can be provided on either side of the voided layer, that is between the homopolymer and voided layers or on the voided layer opposite the homopolymer layer. If desired, a layer of a soft polymer can be provided beneath an outer heat sealable layer for improving the heat seal characteristics of the heat sealable layer. Suitable soft polymers are known in the art.

The further polymeric layer or layers are preferably from 0.5 to 5 microns thick, more preferably from 1 to 2.5 microns thick.

Films of the present invention can be produced by known methods. For example, a layer of a printable polymer, a layer of a propylene homopolymer, and a layer of polypropylene containing a voiding agent can be coextruded, and the resultant composite film can then be oriented by stretching, preferably biaxially. The printable polymer in such a method is preferably a co- or ter-polymer and/or a linear low polyethylene referred to above. The preferred thickness of the resultant printable layer is 1 to 2.5 microns.

In an alternative and preferred method, the layers of propylene homopolymer and voided polypropylene are formed by coextruding a layer of the propylene homopolymer and a layer of polypropylene containing a voiding agent, and the resultant two-layer film is oriented biaxially, the printable layer being applied to the two-layer film between orientation in one direction and the other. This method has been used to produce printable layers of acrylic polymers, the polymer being applied to the two-layer film as an aqueous dispersion using a gravure roller. The dispersions preferably contain an anti-block agent, for example as is known in the art. Printable layers applied between the two stages of orientation will usually be from 0.1 to 2 microns thick, preferably from 0.3 to 0.6 microns thick.

When a further polymeric layer is present, it can be formed in known manner, for example by coextrusion with the layer of propylene homopolymer and the layer of polypropylene containing the voiding agent.

The voiding agent can be selected from those known in the art, for example inorganic fillers, e.g. chalk, silicon or clays, or organic fillers, e.g. nylons or polyesters.

The amount of voiding agent present in the polypropylene layer, in combination with the degree of orientation, will determine the density of the voided layer. The voiding agent will usually be present in an amount of from 4 to 25 weight percent based on the weight of the voided layer. When chalk is used as the voiding agent it is preferably present in an amount of from 15 to 25 weight percent based on the weight of the voided layer. However, while any amount of voiding agent can be used which provides the desired voiding effect on stretching, it is preferred that the film produced has a density of not more than 0.71 g/cm$^3$, e.g. by the use of from 15 to 25 weight percent of chalk.

The present invention provides films having good gloss in combination with printability and usually with a pearlescent effect. The opacity of the film tends to increase with higher filler loadings, e.g. at above 15 weight percent.

In a preferred aspect of the present invention, films of the present invention can also be used as tamper evident packaging materials. This latter effect can be achieved by sealing the voided polypropylene layer of a film of the present invention to itself or to another film, for example using the further polymeric layer referred to hereinbefore using heat seal or cold seal methods. The tamper evident effect is in general more apparent the lower the density of the voided layer, and it is preferred that the voided layer has a density of not more than 0.5 g/cm$^3$. Chalk contents for the voided layer are preferably from 20 to 25 percent by weight to produce a good tamper evident seal. Evidence of tampering is usually shown by separation of the voided layer from the propylene homopolymer layer.

The following Example is given by way of illustration only. All parts are by weight unless stated otherwise.

EXAMPLE

A four layer polymeric web was produced by co-extruding at 240° C. a layer of unfilled polypropylene homopolymer with a layer of polypropylene homopolymer containing about 6 percent by weight of chalk as a voiding agent, two layers of ethylene/propylene copolymer being co-extruded to form the outer surfaces of the web.

The web was extruded on to a chill roll and then stretched 4.5:1 in the machine direction at a temperature of 120° C., and thereafter it was stretched 9.5:1 in the transverse direction in a stenter at 160° C.

The resultant oriented film consisted of a non-voided homopolymer layer 20 microns thick and a voided layer 20 microns thick, with outer copolymer layers each 1.5 microns thick. The density of the film was 0.69 g/cm$^3$.

The film had good hot tack and it was heat sealable to itself. The surface of the film having the layer of non-voided homopolymer immediately beneath the printable copolymer layer had a high gloss of over 80 sheen gloss units.

The film was also provided with a cold seal coating and a satisfactory cold seal was achieved.

I claim:

1. A polymeric film comprising a layer of non-voided propylene homopolymer having a layer of voided polypropylene on one side and a layer of a glossy, printable polymer on the other side.

2. A film according to claim 1, wherein the layer of propylene homopolymer is from 5 to 25 microns thick.

3. A film according to claim 1, wherein the layer of voided polypropylene is from 5 to 25 microns thick.

4. A film according to claim 1, wherein the printable polymer is an acrylic polymer.

5. A film according to claim 4, wherein the layer of printable polymer is from 0.1 to 2 microns thick.

6. A film according to claim 1, wherein the printable polymer comprises a co- or ter-polymer containing units derived from at least two of ethylene, propylene or butene-1.

7. A film according to claim 6, wherein the layer of printable polymer is from 0.5 to 5 microns thick.

8. A film according to claim 1, wherein the voided layer contains from 4 to 25 weight percent of voiding agent, based on the weight of the voided layer.

9. A film according to claim 8, wherein the voided layer contains from 20 to 25 weight percent of voiding agent, based on the weight of the voided layer.

10. A film according to claim 1, having a density of not more than 0.71 g/cm$^3$.

11. A film according to claim 1, wherein the layer of voided polypropylene has a further polymer layer thereon.

12. A film according to claim 1, wherein the further polymer layer is printable and/or heat sealable.

13. A film according to claim 6, wherein the printable polymer comprises said co- or ter-polymer in admixture with linear low density polyethylene.

* * * * *